July 18, 1950 W. C. WOLSKI 2,515,433

RECORD ALBUM CARRIER

Filed Jan. 2, 1948

INVENTOR.
WILLIAM C. WOLSKI
BY
L. F. Hammond
ATTY.

Patented July 18, 1950 2,515,433

UNITED STATES PATENT OFFICE 2,515,433

RECORD ALBUM CARRIER

William C. Wolski, Chicago, Ill.

Application January 2, 1948, Serial No. 231

6 Claims. (Cl. 224—45)

The present invention relates to devices for carrying phonograph records and more specifically to a portable carrier adapted to carry a number of record albums.

In introduction, it may be stated that although the need for some appropriate form of portable container for phonograph records or record albums has long been recognized, yet the types of devices heretofore devised have been quite unsatisfactory; either because their inherent design is such that they are necessarily expensive to manufacture and heavy and cumbersome in use, or else because they provide inadequate protection for the records in transit.

It is accordingly the primary object of the present invention to provide a record carrier having a novel construction and relationship of parts that gives adequate support and protection to the record albums and to the records they contain, and at the same time is light in weight and sufficiently economical in manufacture as to be acceptable to the trade.

A further object of the invention resides in the provision of an album carrier of the general type indicated, but characterized by an open framework construction, having adequate means to protect the albums from damage, yet at the same time leaving almost the entire front cover surfaces of the albums exposed to view. In this connection it is pointed out the utilization of a carrier having structural members only along the corners of the albums not only results in a device that is extremely light in weight in proportion to its size, but also is particularly acceptable to users of the device, since it allows instant identification of the records carried without opening the carrier. Also, many types of record albums now manufactured are provided with highly ornamental covers and, with the open type frame, the ornamental features of the album are exposed to view in such a manner as to further enhance the appearance of the carrier.

The above objects are accomplished in the present invention by the provision of a carrier in the form of an open metal frame, having corner pockets to receive each of the outer corners of the albums, and strips or flanges extending between these pockets to give protection to the album along the full length of each of its edges. In a preferred embodiment of the invention these pockets are formed by the provision of substantially identical upper and lower frames in the form of oppositely oriented flanged plates, so that the lower plate provides a full length socket to receive the bottom edge of the albums, while the upper plate forms a full length cover at the top. A pair of buckles are provided so that the top may be removed to give access to the records.

Referring now to the drawing attached to and forming a part of this specification:

Figures 1, 2, 3:
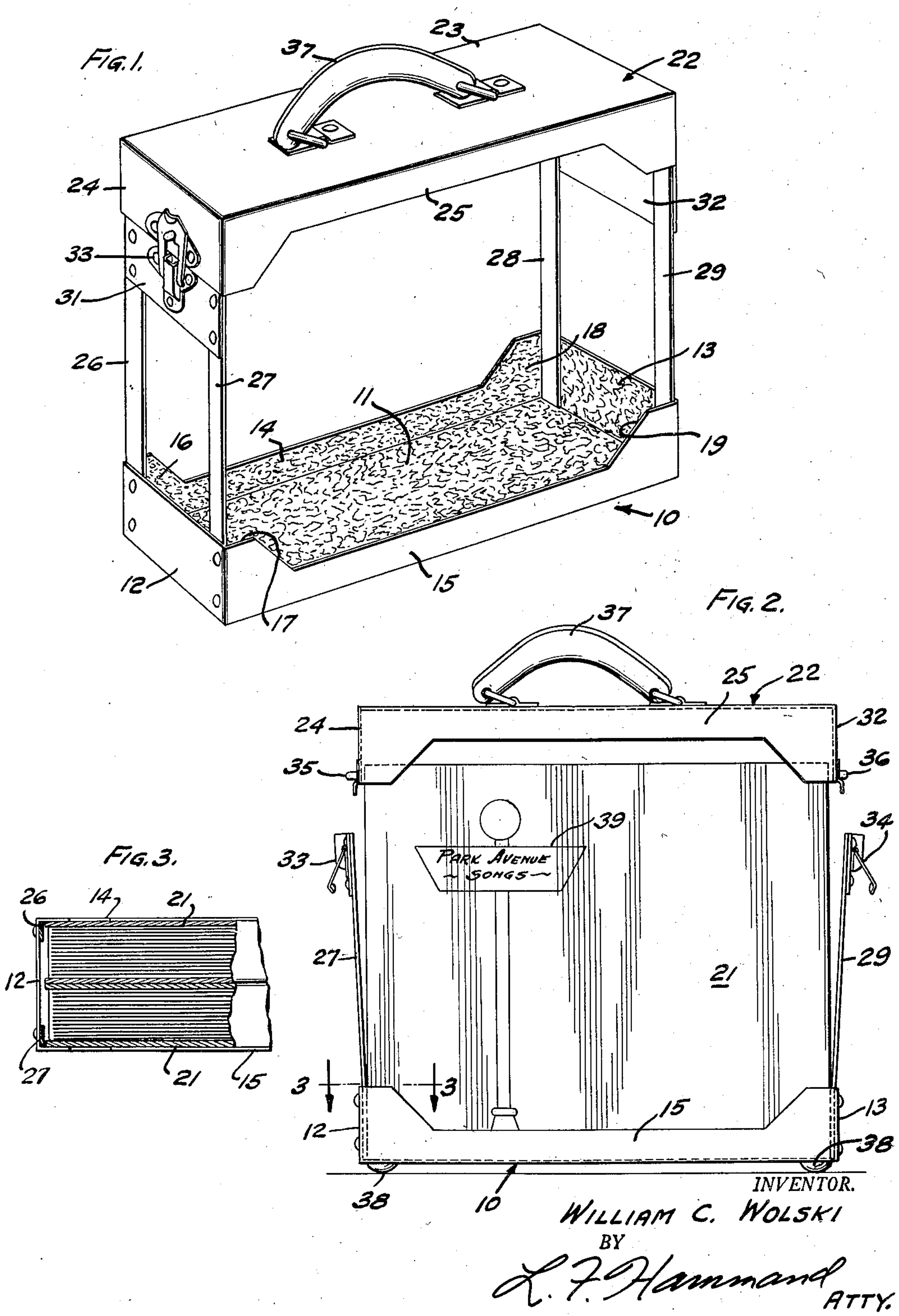
Figure 1 is a perspective view of a record album carrier constructed in accordance with the teachings of this invention. The album is shown in assembled position, but empty.
Figure 2 is a side elevational view of the carrier with record albums in place and the cover partially lifted.
Figure 3 is a detail sectional view taken substantially on the plane of the line 3—3 of Figure 1.

The carrier includes a bottom socket 10 which, in the form of the invention shown, is constructed of a single piece of sheet metal, with a flat bottom plate 11, a pair of upwardly extending end flanges 12 and 13, and narrow side flanges 14 and 15 having widened portions at each end to form corner pockets 16, 17, 18 and 19. The corner pockets thus include three internal surfaces at right angles to each other, so that they are arranged to receive and fit the lower corners of the record albums 21 when placed in the carrier. The top frame or cover of the device may be in the form of an inverted socket 22 identical to the socket but oppositely oriented. Its flat plate 23 serves as a cover for the albums, while the end flanges 24 and side flanges 25 protect the upper edges of the albums. The lower frame 10 and upper frame 22 are secured to each other by tie members which are preferably in the form of flat resilient spring links 26, 27, 28 and 29. These may be riveted or otherwise secured to the frame 10 at its corners, and extend upwardly to the cover 22, where each pair of links is joined by one of the plates 31 and 32. Detachable latches or buckles 33 and 34 are carried on the plates 31 and 32 to engage the fittings 35 and 36 on the end flanges 24 of the cover, so that these buckles interlock the bottom socket and the cover. A handle 37 is attached to the cover to lift the device.

The interior surfaces of the bottom socket 10 and cover 22 may be covered with a fabric or flocked surface to prevent wear on the albums and to improve the appearance of the device, and the outer surfaces may be finished to add to its attractive appearance. Also, if desired, resilient feet 38 may be mounted at the corners of the bottom socket 10 so that the carrier may be placed on polished surfaces of furniture without fear of scratching or damaging the finish.

From the foregoing, it will be apparent that the teachings of this disclosure provide a carrier adapted to exactly fit standard size phonograph albums and, since the four corners of each album are fitted into the corner pockets of the bottom socket and cover, the corners are adequately protected against any damage by impact as the carrier is moved. Also, the edges of the album covers between the corners are protected against their entire length by the spring links 26, 27, 28 and 29, and along the other edges by the flanges 15 and 25 of the bottom member and cover. This open framework gives complete protection to the album, yet at the same time makes possible the provision of the carrier that is unusually light in weight and consequently economical to manufacture. The carrier is attractive in appearance, not only because of its own design, but also by reason of the fact that it exposes the front cover of the album so that any ornamentation, such as indicated at 39, is visible and so that the album may be identified by title or other indicia.

The form of the invention illustrated in the drawings and described herein is the present, preferred, commercial embodiment of this teaching and is believed well suited to a description of the advantages to be gained thereby. In the preferred construction, the bottom socket and cover are each formed in a single piece, but it will be apparent that the different corner pockets may be separately formed and joined by connecting links, if desired. It is also to be recognized that the invention is subject to various other modifications and variations in the shape and relationship of the parts without departing from the teachings of this disclosure nor sacrificing all of the advantages gained thereby, and it is accordingly pointed out that the scope of this invention extends to any modification or variation coming within the terms of the appended claims.

Having thus described the invention, what I claim as new and desire to protect by United States Letters Patent is:

1. In a record album carrier, the combination of a shallow rectangular bottom socket, and a shallow rectangular cover socket identical with the bottom socket and oppositely disposed; each of said sockets comprising a flat plate with flanges at the sides and ends, said ends having widened flanged portions meeting at right angles to each other at the corners to form pockets to receive the corners of albums in the carrier; the top and bottom sockets being spaced apart from each other by a plurality of flat spring strips extending from each corner of one socket to the corresponding corner of the other; together with detachable connectors interlocking the strips with one of the sockets, and a handle on the cover socket for lifting the carrier.

2. In a record album carrier, the combination of a shallow rectangular bottom socket, and an inverted shallow rectangular cover socket; each of said sockets comprising a flat plate with flanges at the sides and ends, said ends having widened flanged portions meeting at right angles to each other at the corners to form pockets to receive the corners of albums in the carrier; the top and bottom sockets being spaced apart from each other by a plurality of links having end portions fixedly secured to the bottom socket and provided with operable means at the opposite ends thereof to removably attach said cover socket to said links; together with a handle for lifting the carrier.

3. In a record album carrier, the combination of a pair of shallow rectangular sockets, identical with each other and oppositely disposed in a vertical plane and having corner pockets to receive the corners of albums in the carrier; the opposite sockets being spaced apart from each other and joined by a plurality of link connections having end portions fixedly secured to one of said sockets and provided with operable means at the opposite ends thereof to removably attach the other of said sockets to said link connections, together with a handle for lifting the carrier.

4. In a record album carrier, the combination of a pair of shallow rectangular sockets, identical with each other and oppositely disposed; each of said sockets comprising a flat plate with flanges at the sides and ends, said ends having widened flanged portions meeting at right angles to each other at the corners to form pockets to receive the corners of albums in the carrier, the opposite sockets being spaced apart from each other and joined by a plurality of strip connections extending between their corners, said strip connections having end portions fixedly secured to one of said sockets and provided with operable latch means operatively associated with the opposite ends thereof and arranged to removably attach the other of said sockets to said strip connections.

5. In a record album carrier, the combination of an open frame having a plurality of flanged corner pockets spaced apart from each other, with a plurality of link connections comprising flat spring strips having end portions respectively fixedly secured to and extending from each corner pocket of one group of adjacent pockets; together with operable means operatively associated with the opposite end portions of said spring strips to removably attach the other group of adjacent pockets to the open frame.

6. In a record album carrier, the combination of an open frame having a bottom group and a top group of flanged corner pockets spaced apart from each other, a plurality of link connections comprising flat spring strips having end portions respectively fixedly secured to and extending from each corner pocket of the bottom group of pockets, and operable means operatively associated with the opposite end portions of said spring strips to removably attach the top group of pockets to the open frame, said flat strips being resilient and adaptable to be bent outwardly of the bottom group of pockets when the top group of pockets are detached, thereby to facilitate insertion of albums into said bottom group of pockets.

WILLIAM C. WOLSKI.

REFERENCES CITED

The following references are of record in the file of this patent:

UNITED STATES PATENTS

| Number | Name | Date |
|---|---|---|
| 1,428,070 | Young | Sept. 5, 1922 |
| 2,422,594 | Stengren | June 17, 1947 |

FOREIGN PATENTS

| Number | Country | Date |
|---|---|---|
| 269,039 | Great Britain | Apr. 14, 1927 |